Dec. 27, 1960  A. Y. DODGE  2,966,246
ONE WAY CLUTCHES
Filed Aug. 5, 1953
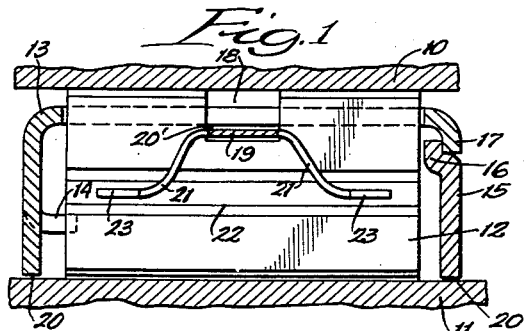
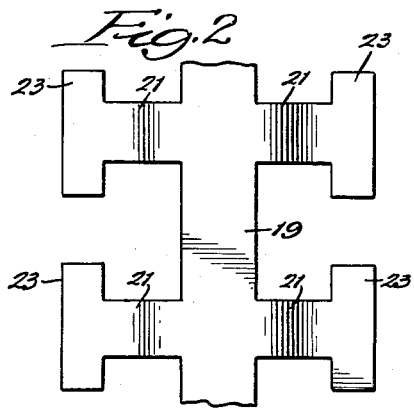
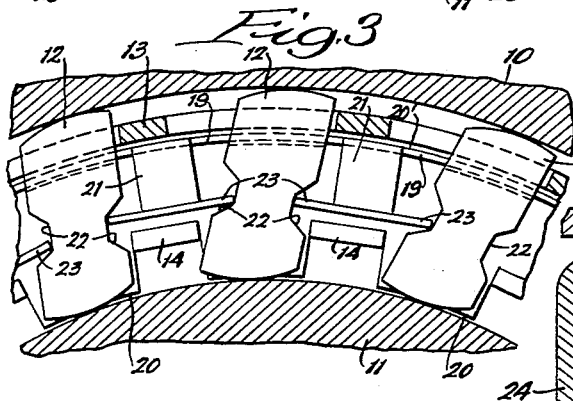
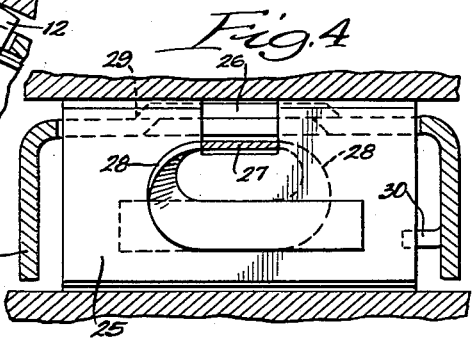
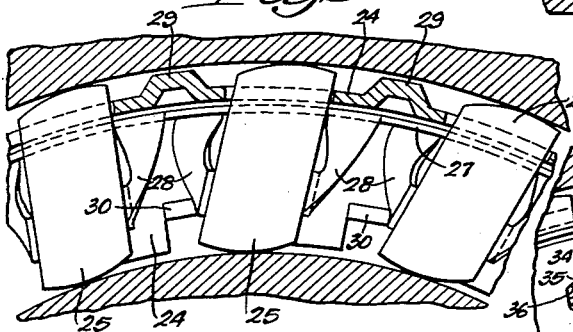
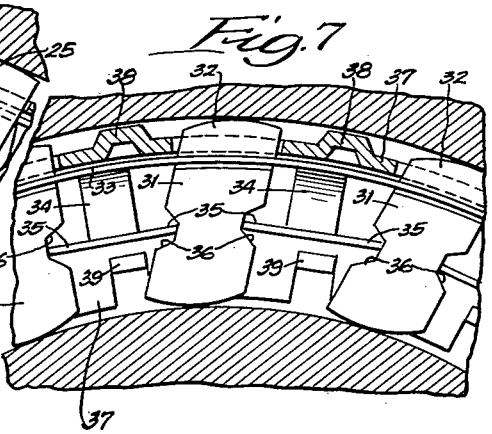
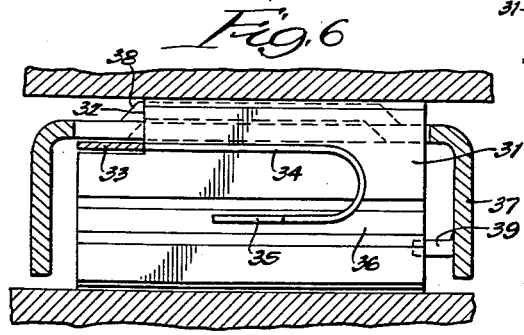
INVENTOR:
Adiel Y. Dodge.
BY
Bair Freeman & Molinare
ATTORNEYS.

United States Patent Office 2,966,246
Patented Dec. 27, 1960

2,966,246
ONE WAY CLUTCHES
Adiel Y. Dodge, Rockford, Ill., assignor to Borg-Warner Corporation, Chicago, Ill., a corporation of Illinois
Filed Aug. 5, 1953, Ser. No. 372,554
16 Claims. (Cl. 192—45.1)

This invention relates to one way clutches and more particularly to clutches of the tilting gripper type.

In one way clutches of the tilting gripper type it is desirable to provide a spring means urging the grippers to tilt toward their engaged position so that they will engage quickly and uniformly when the torque is in the proper direction. Such spring means should be simple and inexpensive to construct, easy to install and, in addition to controlling tilting of the grippers, should assist in holding the grippers in assembled position during handling and mounting in the races. It is also preferable to employ a cage which will protect the spring means, hold the grippers spaced and limit tilting of the grippers without interfering with their free operation within normal working limits.

It is one of the objects of the present invention to provide a one way clutch having a strip type spring which satisfies these several requirements.

Another object is to provide a one way clutch in which the spring includes a strip mounted in notches in the outer surface of the grippers, and arms extending from the strip and engaging the gripper faces.

According to one feature of the invention, the gripper faces are grooved and the ends of the arms are formed with projections extending into the grooves to assist in holding the grippers assembled.

Still another object is to provide a one way clutch in which the spring has a degree of circumferential resilience to allow slight circumferential shifting of the grippers.

A further object is to provide a one way clutch including a cage centered on one of the races which encloses and protects the spring means and prevents excessive tilting of the grippers.

The above and other objects and features of the invention will be more readily apparent from the following description when read in connection with the accompanying drawing in which:

Figure 1 is a partial axial section through a one way clutch embodying the invention;

Figure 2 is a partial developed view of the spring;

Figure 3 is a partial section at right angles to Figure 1;

Figures 4 and 6 are views similar to Figure 1 showing alternative constructions, and Figures 5 and 7 are views similar to Figure 3 of the constructions of Figures 4 and 6 respectively.

The clutch shown in Figures 1 to 3 includes an outer race 10 and an inner race 11 having concentric spaced cylindrical surfaces. A series of tiltable grippers 12 are mounted between the races 10 and 11 in annular array and have their ends curved about spaced centers so that when they are tilted clockwise they will disengage the races and when they are tilted counterclockwise they will engage the races to connect them.

The grippers are mounted in an annular cage which is formed of sheet metal. The cage as shown, is made in two parts, one part 13 having a circumferential web portion formed with openings through which the outer ends of the grippers extend and a side flange to overlie one end of the grippers. Preferably inwardly extending lugs 14 are struck from the lower edge of the flange to project between adjacent grippers as shown in Figure 3 to limit tilting thereof.

The cage is completed by a side ring 15 to overlie the other ends of the grippers and which is offset at its upper end as indicated at 16. The edge of the web portion of the cage member 13 is rolled over as indicated at 17 into the offset to secure the cage members together.

The cage is held centered on the inner race and for this purpose the edges of the flange on part 13 and of the side ring 15 fit over the inner race with a relatively small clearance, shown exaggerated at 20. In this way the cage is held accurately centered relative to the inner race but can turn freely relative to the races.

According to the present invention, each of the grippers is formed in its outer surface with a notch 18 which is of sufficient depth to project slightly below the cross bars of the cage as shown. The notches are adapted to receive an annular spring member formed of relatively thin spring material with an annular central strip 19 to lie within the notches under the cross bars of the cage.

The spring strip 19 clears the cross bars of the cage by an amount indicated at 20' which is greater than the clearance 20 of the cage relative to the inner race. Thus the cage is always held centered so that it cannot engage the spring and interfere with the spring action.

Integral arms 21 extend outward from opposite sides of the central strip 19 and as seen in Figure 1, are curved radially inward and then flattened and extended outward at their outer ends. The ends of the arms 21 are adapted to engage the faces of the grippers to exert a resilient pressure thereon urging the grippers to tilt toward their engaged position, and also to assist in holding the grippers assembled in the cage. Since the main annular strip 19 is itself resilient and since the arms 21 are also resilient, a relatively low rate spring action is provided which will function effectively to control the grippers.

In order that the spring member may hold the grippers positively assembled and may have a positive spring action thereon, each of the grippers is formed in its opposite faces with a transverse groove 22. The ends of the arms 21 are formed with lateral projections 23 which fit into the grooves 22 as best shown in Figure 3. In this way the arms can hold the grippers positively assembled in the cage, and can act on them effectively to tilt them.

The grooves 22 may be located as shown in Figure 3 and if desired, the arms 21 may be given a slight twist so that the end of the projection 23 at the right as seen in Figure 3, will press downward on the adjacent gripper face while the end of the same projection at the left will press upward on the gripper face. In this way the spring arms exert a turning couple on the grippers tending to tilt them into engagement. During disengagement the spring arms will yield and in the event of excessive gripper movement, the grippers will engage the cage cross bars and the fingers 14 to prevent excessive turning which might damage the spring.

In a construction as shown in Figures 1 to 3 in which the cage is centered by the inner race, the cross bars in the cage web 13 which extend between the grippers are made relatively narrow to enable a large degree of movement of the outer ends of the grippers while the lugs 14 will be wider to limit movement of the iner ends of the grippers. Since there will be some friction drag between the cage and the inner race, the lugs 14 will tend to tilt the grippers toward both their engaging and disengaging positions as the relative directions of rotation of the races change. The outer ends of the grippers can move through the relatively large openings in the cage web but will engage the cross bars in the cage web so that excessive tilting will be prevented. In this way the grippers are prevented from tilting to an inoperative position and are controlled to move simultaneously into both engagement and disengagement.

In the alternative construction of Figures 4 and 5, the cage is illustrated as a simple channel-shaped member 24 whose flanges clear the inner race and having openings in its web through which the tiltable grippers 25 may extend. The grippers are formed with notches 26 in their outer surfaces to receive an annular spring strip 27. The strip 27 has arms 28 extending from its opposite sides which are bent inward and twisted as shown, so that their flat faces will lie flat against the gripper faces toward the inner ends of the grippers. The arms 28 are resiliently biased in a direction to tilt the grippers toward engagement and in this case the gripper faces are flat to engage the flat arm ends. The friction of the spring arms is relied upon to hold the grippers assembled in the cage during handling and installation but otherwise, this construction is similar to and functions in the same manner as that of Figures 1 to 3.

The cage is held centered by forming it with projections 29 pressed from the web portion and having a relatively close sliding fit against the outer race. The clearance between the projections 29 and the outer race is less than the clearance between the cage web and the spring so that action of the spring cannot be interfered with by radial movement of the cage.

The cage flanges are formed with narrow lugs 30 projecting between the inner ends of the grippers and the outer ends of the grippers fit with a relatively small clearance into the openings in the cage web. In this construction the cage tends to turn with the outer race and tilting of the grippers is controlled in part by engagement of the cross bars in the cage web with the outer ends of the grippers. The lugs 30 will permit the grippers to tilt between their maximum engaging and disengaging positions but will prevent excessive tilting which might damage the spring or move the grippers to an inoperative position.

In the construction of Figures 6 and 7, the grippers as shown at 31 are formed with notches 32 at one end. These notches receive an annular spring strip 33 which lies within and clears the cage as shown and from which resilient arms 34 project from one side only. The arms 34 are bent inward and terminate in projections 35 similar to the projections 23 which extend into notches 36 in the faces of the grippers. In this construction as in Figures 1 to 3, the notches or grooves 36 may be so located that a turning couple will be produced on the grippers by the spring members tending to urge the grippers into their engaged position.

This construction includes a simple channel-shaped cage 37 similar to the cage 24 and formed with projections 38 slidably engaging the outer race. The clearances relative to the outer race and the spring strip 33 are the same as in Figures 4 and 5. This cage 37 may be formed with narrow stop lugs 39 struck from their flanges to limit tilting of the grippers in the same manner as the lugs 30 of the Figures 4 and 5.

In all of the constructions shown, the spring member is formed by an annular strip lying in notches in the outer surfaces of the grippers and from which resilient arms project to engage the grippers and urge them to tilt. The arms are also resilient circumferentially in all of the embodiments shown so that the grippers can shift slightly to accommodate irregularities or inaccuracies in manufacture. Since the capacity of the outer race in all cases exceeds that of the inner race, the loss of gripper area due to formation of the notches will not adversely affect the capacity of the clutch.

This is a continuation-in-part application based upon my application Serial No. 239,708 entitled "One-Way Clutches" and filed August 1, 1951, now abandoned.

While several embodiments of the invention have been shown and described in detail, it will be understood that these are illustrative only and are not to be taken as a definition of the scope of the invention, reference being had for this purpose to the appended claims.

What is claimed is:

1. A one way engaging device comprising a series of tiltable grippers adapted to be arranged in annular array between coaxial races and respectively having radially spaced race-engaging surfaces, each of the grippers having a notch in one of its race-engaging surfaces, and a spring strip including a relatively narrow annular body portion fitting in the notches in the grippers with its outer surface lying between the race-engaging surfaces of the grippers and integral arms projecting from the body portion to engage the faces of the grippers effective to bias the grippers into engagement with the races.

2. A one way engaging device comprising a series of tiltable grippers adapted to be arranged in annular array between coaxial races and respectively having radially spaced race-engaging surfaces, each of the grippers having a notch in one of its race-engaging surfaces, and a spring strip including a relatively narrow annular body portion fitting in the notches in the grippers with its outer surface lying between the race-engaging surfaces of the grippers and integral arms projecting from the body portion to engage the faces of the grippers effective to bias the grippers into engagement with the races, the grippers including grooves in their circumferential faces and the arms including projections at their ends disposed within the grooves.

3. A one way engaging device comprising a series of tiltable grippers adapted to be arranged in annular array between coaxial races and respectively having radially spaced race engaging surfaces, each of the grippers having a notch in one of its race engaging surfaces, and a spring strip including a relatively narrow annular body portion fitting in the notches in the grippers with its outer surface lying between the race engaging surfaces of the grippers, and resilient flat arms integral with and extending from the body portion of said strip disposed between adjacent grippers and bent radially inwardly and including radially twisted ends simultaneously engaging radially spaced face portions of adjacent grippers.

4. A one way engaging device comprising a series of tiltable grippers adapted to be arranged in annular array and respectively having radially spaced race-engaging surfaces, each of the grippers having a notch in one of its race-engaging surfaces centrally of its length, an annular spring strip fitting in the notches with its outer surface lying radially between the race-engaging surfaces of the grippers, resilient arms integral with and extending laterally from opposite sides of the strip between adjacent grippers effective to bias the grippers into engagement with the races, the grippers including grooves in their circumferential faces, and projections at the ends of the arms disposed within the grooves.

5. A one way engaging device comprising a series of tiltable grippers adapted to be arranged in annular array, each of the grippers having a notch in its outer surface centrally of its length, a spring strip fitting in the notches with its outer surface lying radially within the outer surfaces of the grippers, and resilient flat arms integral with and extending laterally from opposite sides of the strip disposed between adjacent grippers and bent radially inwardly and including radially twisted ends simultaneously engaging radially spaced face portions of adjacent grippers.

6. A one way engaging device adapted for operation between a pair of races comprising an annular cage formed with a series of cross bars defining spaced openings, a series of tiltable grippers extending through the openings respectively having radially spaced race-engaging surfaces and each having a notch in one of its race-engaging surfaces, an annular spring strip fitting in the notches and lying radially within the cage adjacent to the cross bars, and resilient arms integral with and extending from the strip between adjacent grippers and resiliently engaging the faces of the grippers effective to bias the grippers into race engaging position.

7. A one way engaging device adapted for operation between a pair of races comprising an annular cage formed with a series of cross bars defining spaced openings, a series of tiltable grippers extending through the openings respectively having radially spaced race-engaging surfaces and each having a notch in one of its race-engaging surfaces, an annular spring strip fitting in the notches and lying within the cage adjacent to the cross bars, and resilient arms integral with and extending from the strip between adjacent grippers and resiliently engaging the faces of the grippers effective to bias the grippers into race engaging position, the circumferential faces of the grippers including grooves therein, and projections on the ends of the arms disposed within the grooves.

8. A one way engaging device comprising, in combination, cylindrical inner and outer races, a series of tiltable grippers in annular array between the races respectively including radially spaced race-engaging surfaces to engage the races when tilted in one direction and release the races when tilted in the other direction, each of the grippers having a notch in one of its race-engaging surfaces, an annular spring strip fitting in the notches, and resilient arms integral with and extending laterally from the strip and engaging the grippers to urge them to tilt in said one direction.

9. A one way engaging device comprising, in combination, cylindrical inner and outer races, a series of tiltable grippers in annular array between the races respectively including a pair of radially spaced race-engaging surfaces to engage the races when tilted in one direction and release the races when tilted in the other direction, each of the grippers having a notch in one of its race-engaging surfaces, an annular spring strip disposed within the notches, an annular rigid cage including a series of cross bars defining spaced openings through which the grippers extend, the cross bars overlying the spring strip, stop members on the cage cooperating with the cross bars to limit tilting of the grippers, and resilient arms integral with and extending from the strip and engaging the grippers effective to urge them to tilt in said one direction.

10. A one way engaging device for connecting concentric cylindrical races comprising a series of tiltable grippers arranged in coaxial array between the races respectively including a pair of radially spaced race-engaging surfaces, each of the grippers having a notch in one of its race-engaging surfaces, an annular spring strip fitting in the notches and having resilient arms projecting therefrom engaging the grippers effective to urge them to tilt into race-engaging position, and an annular cage including a cylindrical web formed with spaced openings therein through which the grippers extend and radially extending parts connected to the web and spaced closely adjacent one of the races, the web clearing the spring strip by an amount greater than the clearance between said parts and said one of the races.

11. A one way engaging device for connecting concentric cylindrical races comprising a series of tiltable grippers arranged in coaxial array between the races respectively including a pair of radially spaced race-engaging surfaces, each of the grippers having a notch in one of its race-engaging surfaces, an annular spring strip disposed within the notches and having integral resilient arms projecting therefrom engaging the grippers effective to urge them to tilt into race-engaging position, and an annular cage of channel section including a cylindrical web formed with spaced openings through which the grippers extend and inwardly extending side flanges overlying the ends of the grippers and spaced closely adjacent to the inner race, the web of the cage clearing the spring strip by an amount exceeding the clearance between the side flanges and the inner race.

12. A one way engaging device for connecting concentric cylindrical races comprising a series of tiltable grippers arranged in coaxial array between the races respectively including a pair of radially spaced race-engaging surfaces, each of the grippers having a notch in one of its race-engaging surfaces, an annular spring strip disposed within the notches and having integral resilient arms projecting therefrom engaging the grippers effective to urge them to tilt into race engaging position, and an annular cage of channel section including a cylindrical web formed with spaced openings through which the grippers extend and inwardly extending side flanges overlying the ends of the grippers and spaced closely adjacent to the inner race, the web of the cage clearing the spring strip by an amount exceeding the clearance between the side flanges and the inner race and lugs on the cage flanges projecting between adjacent grippers and engageable with the inner portions of the grippers to limit tilting thereof.

13. A one way engaging device for connecting concentric cylindrical races comprising an annular cage of inwardly facing channel section fitting between the races, the web of the cage having a series of spaced openings therein, a series of tiltable grippers between the races projecting through the openings in the cage web, an annular spring strip fitting in the cage and formed with integral resilient arms engaging the grippers to urge them to tilt into engagement with the races, integral lugs extending inward from the cage flanges between adjacent grippers, and the grippers having greater clearance with respect to the openings in the web than with the lugs.

14. A one way engaging device comprising a series of tiltable grippers adapted to be arranged in annular array between coaxial races and respectively having radially spaced race engaging surfaces, each of the grippers having a groove in its outer surface at one end, a spring strip fitting in the grooves with its outer surface lying between the race engaging surfaces of the grippers, and resilient integral arms projecting from one side of the strip between adjacent grippers and engaging the faces of the grippers effective to bias the grippers into engagement with the races.

15. The device of claim 14 wherein the arms are looped radially inward, the faces of the grippers have grooves formed therein, and the arms have projections at their ends fitting into the grooves.

16. A one way engaging device adapted for operation between a pair of races comprising an annular cage formed with a series of cross bars defining spaced openings, a series of tiltable grippers extending through the openings, each gripper having radially spaced race engaging surfaces and a notch in one of its race engaging surfaces, an annular spring strip fitting in the notches and lying radially within the cage adjacent to the cross bars, and resilient arms integral with and extending from the strip between adjacent grippers and resiliently engaging the faces of the grippers and the arms being bent inward and twisted so that their sides engage the faces of the grippers thus being effective to bias the grippers into race engaging position.

References Cited in the file of this patent

UNITED STATES PATENTS

| 2,407,772 | Dodge | Sept. 17, 1946 |
| 2,630,896 | Dodge | Mar. 10, 1953 |
| 2,683,510 | Troendly | July 13, 1954 |
| 2,748,912 | Banker | June 5, 1956 |
| 2,753,027 | Troendly et al. | July 3, 1956 |